UNITED STATES PATENT OFFICE.

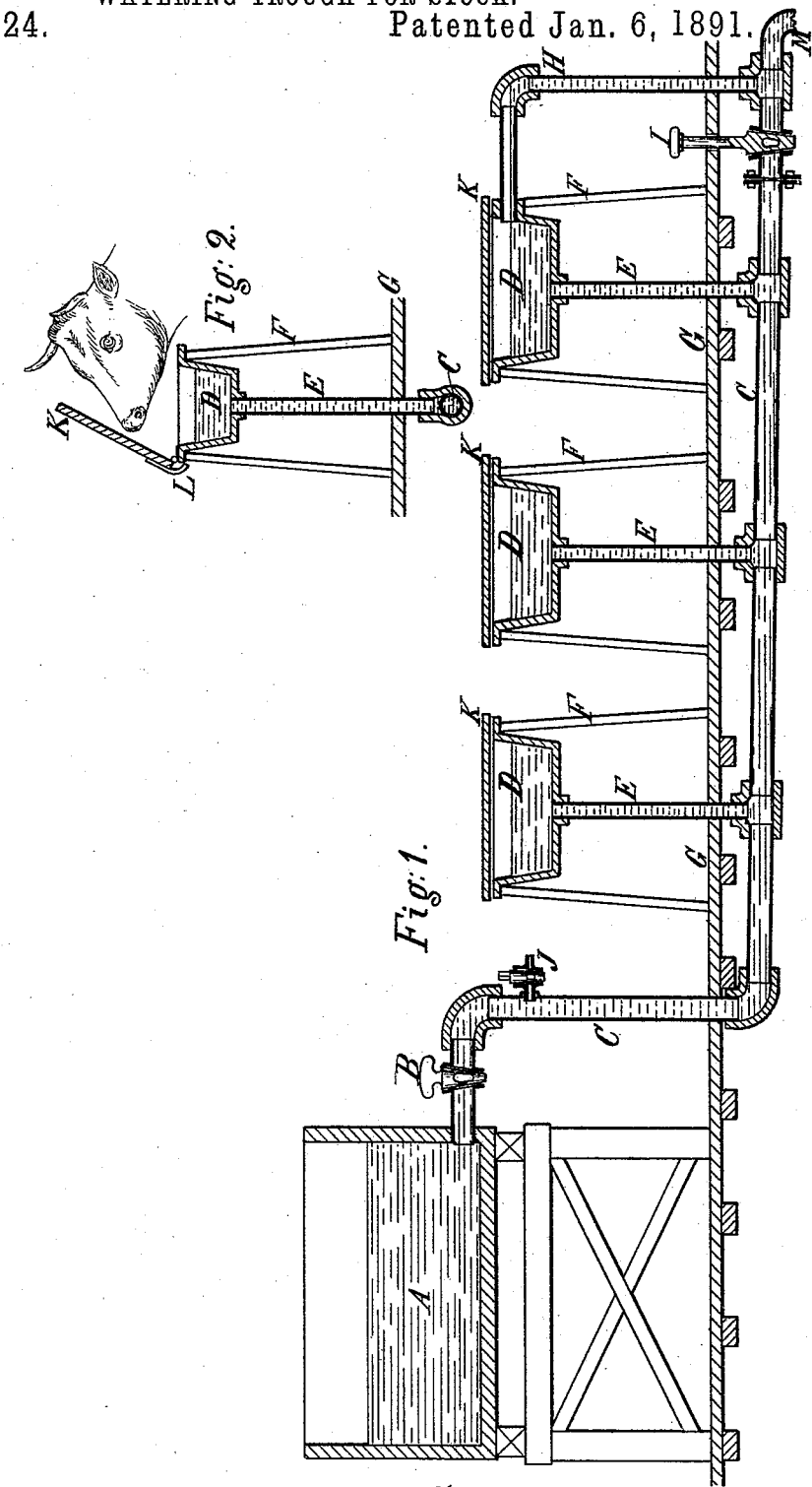

JOHN ALLIS, OF LOWVILLE, NEW YORK.

WATERING-TROUGH FOR STOCK.

SPECIFICATION forming part of Letters Patent No. 444,324, dated January 6, 1891.

Application filed April 25, 1890. Serial No. 349,574. (No model.)

*To all whom it may concern:*

Be it known that I, JOHN ALLIS, a citizen of the United States, residing at Lowville, in the county of Lewis and State of New York, have invented new and useful Improvements in Watering-Troughs for Stock, of which the following is a specification.

The improvements referred to relate to the arrangement of separate and individual watering-places, so arranged and constructed that the entire apparatus may be controlled from one point and by one supply valve or cock, the individual troughs so constructed that the water conducted to them shall always be pure and sweet as the fountain, and the receptacles cleanly and free from dirt or filth. While more immediately intended for animals confined in inclosures and restricted in their movements, as those tethered or stanchioned, yet it is perfectly practical and of great service when erected in the open field for preserving the water more cleanly by distributing the supply to two or more points about the premises.

In the attached or accompanying drawings, making part of this specification, Figure 1 is a sectional longitudinal elevation of the apparatus. Fig. 2 is a cross vertical section of one of the individual troughs and its supply-pipe.

Similar letters refer to similar parts in each of the drawings, and in which—

A represents the general supply, which may be a running spring or large storage-reservoir, to be filled by pumping or otherwise, as may be practicable. The valve B adjusts and regulates the amount of water as it passes into the supply-pipe C, which latter passes beneath the floor G, and is carried such distance as may be desirable for the stock to be cared for.

D D are small supplemental reservoirs or drinking-troughs in front of the stanchions and a little distance therefrom and so arranged in numbers that there will be one trough midway between each alternate pair of animals. These troughs are preferably rectangular in horizontal outline and sufficiently large to allow two animals to drink therefrom at the same time. From the bottom of each of the troughs a pipe E connects with the main supply-pipe C, and the one farthest removed from the cock B is provided with an overflow-pipe H, arranged near the top and opening near its lower end into the main supply-pipe. The several troughs D D are all placed at a proper height to be convenient of access for the animals to be served, and are all at the same height from the floor. These troughs may be supported by legs or frames, but are most practical when surrounded by and resting upon a curb F, which will protect the vertical supply-pipe E and make it more easy to care for the fodder placed in front of the animal. The pipe C has a valve I at some point between the last vertical supply-pipe and the point where the waste or overflow pipe H enters the same. The pipe C is also supplied with a petcock J near the valve B.

Each of the troughs D D is provided with a cover attached to the back of the same by hinges and provided with a bent stop L, whose office it is to prevent the lid being raised quite to the perpendicular position. The width of the cover K is such that when closed it extends a little beyond the front edge of the trough D.

Operation: The main reservoir A being supplied and full, the valve I and the petcock J are both to be closed and the valve B opened. This allows of the water passing into and filling the main pipe C and rising in the vertical pipes E E to pass into and fill each of the troughs until the surface of the water reaches the level of the opening in the discharge-pipe H. This prevents the overflow of each of the separate troughs and the surplus passes out through the pipe H and thence down and out of the lower end of the pipe C beyond the valve I. This supply-pipe may be so regulated at the valve B that a light but constant flow may be maintained at the pipe H, such overflow to be regulated at will by the herdsman. When the animal desires to drink, all that it has to do is to thrust its nose beneath the edge of the cover K (an act which it very soon learns to perform) and, raising the same sufficiently to allow access to the contents of the trough, satisfies its needs, when, upon withdrawing its nose, the cover returns to its proper position by its own gravity, preserving the cleanliness of the trough from the entrance of foreign matter. All the while the animal is drinking the supply of water is kept up through the pipe E. If for any reason it is desired to drain the troughs of their contents, it may be done by closing the valve B and opening the petcock J and valve I. This allows the water in each trough to settle down through its pipe E into the pipe C, thence out through the valve I and discharge at the exit M, air being supplied at J to allow of the subsidence.

When used in the yard or field, the supply-pipe C should be buried in the earth sufficiently to avoid all danger from frost, and in severe cold weather water may only be allowed to rise in the pipes and troughs at such intervals as the attendant may deem advisable and safe.

I claim—

An apparatus for watering stock, consisting of the main supply-pipe C, with its vertical branches E E, the former provided with the regulating-valves B and I and air-valve J, the branch pipes entering into and connected with separate and individual troughs D D, the last of the series being provided with the safety or overflow drainage-pipe H, all arranged as set forth and described.

JOHN ALLIS.

Witnesses:
 NETTIE PATRICK,
 J. C. HOUSE.